US009807390B2

(12) United States Patent
Saitoh et al.

(10) Patent No.: US 9,807,390 B2
(45) Date of Patent: Oct. 31, 2017

(54) IMAGE CODING APPARATUS FOR CORRECTING COARSENESS AND ENCODING UNCOMPRESSED DATA

(75) Inventors: Makoto Saitoh, Osaka (JP); Yuki Haraguchi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1458 days.

(21) Appl. No.: 13/021,315

(22) Filed: Feb. 4, 2011

(65) Prior Publication Data

US 2011/0200102 A1   Aug. 18, 2011

(30) Foreign Application Priority Data

Feb. 16, 2010   (JP) .................................. 2010-031809

(51) Int. Cl.
| | |
|---|---|
| *H04N 19/124* | (2014.01) |
| *H04N 19/146* | (2014.01) |
| *H04N 19/176* | (2014.01) |
| *H04N 19/61* | (2014.01) |
| *H04N 19/14* | (2014.01) |
| *H04N 19/152* | (2014.01) |
| *H04N 19/194* | (2014.01) |

(Continued)

(52) U.S. Cl.
CPC ........... *H04N 19/124* (2014.11); *H04N 19/14* (2014.11); *H04N 19/146* (2014.11); *H04N 19/152* (2014.11); *H04N 19/176* (2014.11); *H04N 19/194* (2014.11); *H04N 19/61* (2014.11); *H04N 19/147* (2014.11); *H04N 19/149* (2014.11)

(58) Field of Classification Search
CPC ........... H04N 7/26053; H04N 7/26186; H04N 7/26324
See application file for complete search history.

(56) References Cited

U.S. PATENT DOCUMENTS

| | | |
|---|---|---|
| 6,408,027 B2 | 6/2002 | Mori et al. |
| 2001/0007575 A1 | 7/2001 | Mori et al. |

(Continued)

FOREIGN PATENT DOCUMENTS

| | | |
|---|---|---|
| JP | 10-336649 A | 12/1998 |
| JP | 2001-169281 A | 6/2001 |

(Continued)

*Primary Examiner* — William C Vaughn, Jr.
*Assistant Examiner* — Michael J Hess
(74) *Attorney, Agent, or Firm* — Oblon, McClelland, Maier & Neustadt, L.L.P.

(57) ABSTRACT

An image coding apparatus obtains a quantization parameter of a macroblock to be encoded. The quantization parameter is corrected by adding a correction value thereto. An encoding part encodes the macroblock by using the corrected quantization parameter. After the encoding, a quantization parameter correction part calculates the cumulative target amount of codes by accumulating the target amounts of codes set for the encoded macroblocks, respectively, and calculates the cumulative amount of generated codes by accumulating the respective amounts of generated codes of the encoded macroblocks. If the cumulative amount of generated codes is larger than the cumulative target amount of codes, the quantization parameter correction part increments the correction value. A new macroblock to be encoded is quantized more coarsely than the encoded macroblocks.

8 Claims, 9 Drawing Sheets

(51) Int. Cl.
*H04N 19/149* (2014.01)
*H04N 19/147* (2014.01)

(56) References Cited

U.S. PATENT DOCUMENTS

| | | | |
|---|---|---|---|
| 2002/0044605 A1 | 4/2002 | Nakamura | |
| 2005/0254576 A1* | 11/2005 | Huang | 375/240.03 |
| 2007/0147498 A1* | 6/2007 | Tanaka | H04N 19/115 375/240.03 |
| 2008/0181522 A1* | 7/2008 | Hosaka et al. | 382/251 |
| 2011/0150094 A1* | 6/2011 | Wang | 375/240.16 |
| 2011/0176606 A1 | 7/2011 | Fuchie | |

FOREIGN PATENT DOCUMENTS

| | | |
|---|---|---|
| JP | 2002-94989 A | 3/2002 |
| JP | 2006-325239 | 11/2006 |
| WO | WO 2009/157579 A1 | 12/2009 |

* cited by examiner

| m0<br>Idx=0<br>Level:1 | m1<br>Idx=1<br>Level:0 | m2<br>Idx=2<br>Level:1 | m3<br>Idx=3<br>Level:0 | m4<br>Idx=4<br>Level:0 | m5<br>Idx=5<br>Level:1 |
|---|---|---|---|---|---|
| m6<br>Idx=6<br>Level:0 | m7<br>Idx=7<br>Level:0 | m8<br>Idx=8<br>Level:1 | m9<br>Idx=9<br>Level:1 | m10<br>Idx=10<br>Level:1 | m11<br>Idx=11<br>Level:0 |
| m12<br>Idx=12<br>Level:0 | m13<br>Idx=13<br>Level:1 | m14<br>Idx=14<br>Level:2 | m15<br>Idx=15<br>Level:2 | m16<br>Idx=16<br>Level:1 | m17<br>Idx=17<br>Level:2 |
| m18<br>Idx=18<br>Level:0 | m19<br>Idx=19<br>Level:2 | m20<br>Idx=20<br>Level:1 | m21<br>Idx=21<br>Level:2 | m22<br>Idx=22<br>Level:2 | m23<br>Idx=23<br>Level:1 |
| m24<br>Idx=24<br>Level:1 | m25<br>Idx=25<br>Level:2 | m26<br>Idx=26<br>Level:2 | m27<br>Idx=27<br>Level:1 | m28<br>Idx=28<br>Level:1 | m29<br>Idx=29<br>Level:0 |
| m30<br>Idx=30<br>Level:0 | m31<br>Idx=31<br>Level:2 | m32<br>Idx=32<br>Level:1 | m33<br>Idx=33<br>Level:0 | m34<br>Idx=34<br>Level:0 | m35<br>Idx=35<br>Level:0 |

FIG. 3

ACTIVITY LEVEL CORRESPONDENCE TABLE

| ACTIVITY | 0 ~ 511 | 512 ~ 1023 | 1024 ~ |
|---|---|---|---|
| ACTIVITY LEVEL | 0 | 1 | 2 |

LEVEL THRESHOLD VALUE Th(0)=511
Th(1)=1023

PARAMETER INITIAL VALUE

| ACTIVITY LEVEL | Ta(i) | Ca(i) | Ea(i) | HQa(i) | FMa(i) |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |

Ta(i) : LEVEL CUMULATIVE TARGET AMOUNT OF CODES
Ca(i) : LEVEL CUMULATIVE AMOUNT OF GENERATED CODES
Ea(i) : LEVEL EXCESSIVE AMOUNT OF CODES
HQa(i) : LEVEL CORRESPONDING CORRECTION VALUE
FMa(i) : CORRECTION USE COUNT

FIXED PARAMETER

| ACTIVITY LEVEL | ST(i) | Ga(i) | Ia(i) | La(i) | Pa(i) |
|---|---|---|---|---|---|
| 0 | 80 | 320 | 1 | 4 | 8 |
| 1 | 130 | 320 | 1 | 4 | 6 |
| 2 | 150 | 320 | 1 | 4 | 4 |

ST(i) : LEVEL TARGET AMOUNT OF CODES
Ga(i) : TARGET AMOUNT ADJUSTMENT VALUE
Ia(i) : LEVEL CORRESPONDING ADDITIONAL VALUE
La(i) : LEVEL UPPER LIMIT VALUE
Pa(i) : UPDATE PERMISSION COUNT

FIG. 10

IMAGE CODING APPARATUS FOR CORRECTING COARSENESS AND ENCODING UNCOMPRESSED DATA

BACKGROUND OF THE INVENTION

Field of the Invention

The present invention relates to a technique for encoding image data on the basis of a coding system such as MPEG, H.264, or the like.

Description of the Background Art

Image data to be delivered on digital broadcasts, those to be stored in media such as DVDs (Digital Versatile Disks) and hard disks, and the like are compressed according to various coding systems. The object for such compressions of image data is to avoid constraint on a transmission band, increase the transmission rate, decrease the memory size, or the like.

For compression of image data, coding system such as MPEG, H.264, and the like are often used. In encoders for such coding system, a target value of the amount of codes (the target amount of codes) generated per unit time (1 picture or the like) is set in advance. The encoders perform code amount control so that the amount of codes of compressed image data generated per unit time (the amount of generated codes) may not exceed the target amount of codes.

In the code amount control, performed is feedback control based on a difference value between the target amount of codes and the amount of currently generated codes. If the amount of currently generated codes is larger than the target amount of codes, a quantization step value is set relatively coarse. If the amount of currently generated codes is smaller than the target amount of codes, a quantization step value is set fine. It is thereby possible to control the amount of codes so that the average amount of generated codes per long unit time (per second or the like) may become the target amount of codes.

In the above-discussed method for code amount control, however, the amount of generated codes per short unit time such as per GOP (Group of Picture), per picture, or the like becomes larger than the target amount of codes. In this case, there is a possibility that a destination buffer to which the compressed image data is transmitted may overflow and so on.

Japanese Patent Application Laid Open Gazette No. 2006-325239 discloses an encoder capable of suppressing the amount of codes per short unit time to the target amount of codes. In the encoder, a plurality of macroblocks of an input image signal is quantized by n quantizers in which different quantization step values are set. The encoder performs variable length coding of the plurality of macroblocks quantized with the respective quantization step values, to thereby detect the amount of codes of the plurality of macroblocks by the quantization step value. The encoder determines the combination of the quantization step values for the plurality of macroblocks so that the amount of codes of a picture may be most approximated to the target amount of codes of the picture.

When the input image signal is encoded by the method described in Japanese Patent Application Laid Open Gazette No. 2006-325239, however, the amount of computation becomes enormous. For this reason, it is difficult to perform encoding of the input image signal in real time.

SUMMARY OF THE INVENTION

The present invention is intended for an image coding apparatus for encoding uncompressed image data. According to an aspect of the present invention, the image coding apparatus comprises a determination part for determining a coarseness set value indicating the coarseness of quantization of a current macroblock to be encoded, a coarseness correction part for correcting the coarseness set value by adding a correction value to the coarseness set value, and an encoding part for encoding the current macroblock by using the corrected coarseness set value, and in the image coding apparatus of the present invention, the coarseness correction part includes a code amount accumulation part for calculating the first cumulative amount of generated codes by accumulating the respective amounts of generated codes of macroblocks ranging from a first macroblock which is first encoded to the current macroblock and calculating the first cumulative target amount of codes by accumulating the target amounts of codes set for the macroblocks, respectively, and a correction value updating part for updating the correction value if the first cumulative amount of generated codes is larger than the first cumulative target amount of codes.

In the present invention, after the encoding of the current macroblock, the correction value to be added to the coarseness set value indicating the coarseness of quantization is updated on the basis of a result of comparison between the cumulative amount of generated codes and the cumulative target amount of codes. Since the macroblock is not encoded for the purpose of being used for the code amount control, the image data can be encoded in real time. Further, since the code amount control is performed every time when a macroblock is encoded, it is possible to prevent the amount of generated codes of a picture from significantly exceeding the target amount of codes of the picture.

The image coding apparatus of the present invention further comprises a level determination part for determining a level of the current macroblock on the basis of an activity indicating the degree of dispersion of pixel values in the current macroblock, and in the present invention, the correction value includes a level corresponding correction value corresponding to the level, the coarseness correction part corrects the coarseness set value by using a current level corresponding correction value corresponding to a current level which is a level of the current macroblock among the level corresponding correction values, and the correction value updating part updates the current level corresponding correction value if the first cumulative amount of generated codes is larger than the first cumulative target amount of codes.

In the present invention, the level corresponding correction value in accordance with the activity level of the current macroblock is used as a correction value for the coarseness set value. The level corresponding correction value used as the correction value is updated on the basis of the comparison result. It is therefore possible to prevent the respective image qualities of all the macroblocks from being uniformly degraded due to the code amount control.

Therefore, it is an object of the present invention to provide a technique for suppressing an increase in the amount of generated codes in a short time unit and encoding image data in real time.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, with reference to figures, the preferred embodiment of the present invention will be discussed.

{1. Overall Configuration}

Figure 1:
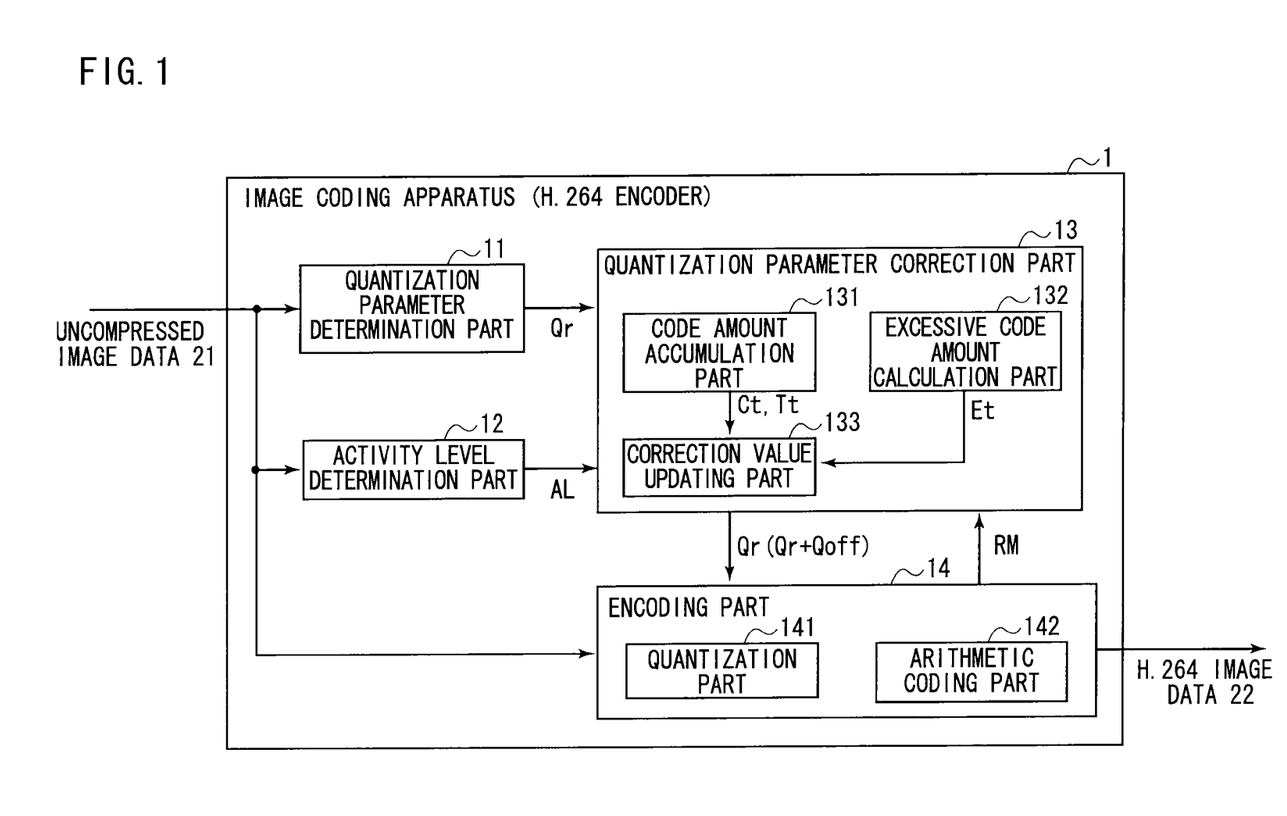
FIG. 1 is a block diagram showing a functional constitution of an image coding apparatus in accordance with a preferred embodiment of the present invention.

FIG. 1 is a block diagram showing a functional constitution of an image coding apparatus 1 in accordance with the preferred embodiment of the present invention. As shown in FIG. 1, the image coding apparatus 1 encodes inputted uncompressed image data 21 according to the H.264 system and outputs H.264 image data 22.

The image coding apparatus 1 comprises a quantization parameter determination part 11, an activity level determination part 12, a quantization parameter correction part 13, and an encoding part 14. Hereinafter, among macroblocks of the uncompressed image data 21, a macroblock to be encoded is referred to as a "current MB (Macroblock)".

The quantization parameter determination part 11 determines a quantization parameter Qr of the current MB. The quantization parameter Qr is used for determining a quantization step value of the current MB.

The activity level determination part 12 calculates an activity of the current MB and determines an activity level AL of the current MB on the basis of the calculated activity. The activity and the activity level AL will be discussed later in detail.

The quantization parameter correction part 13 corrects the quantization parameter Qr of the current MB. The quantization parameter correction part 13 determines a QP (Quantization Parameter) correction value Qoff which is a correction value for the quantization parameter Qr on the basis of the activity level AL of the current MB.

Figure 6:
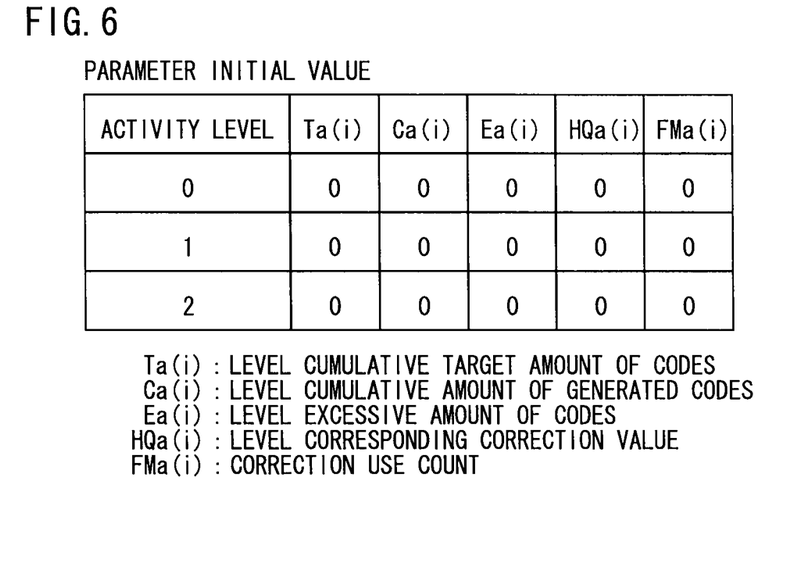
FIG. 6 shows a table representing initial values of variable parameters which vary in accordance with the encoding of a macroblock.

The quantization parameter correction part 13 holds a level corresponding correction value HQa(i) which is set for each activity level AL and is to be used for correction of the quantization parameter Qr (see FIG. 6). The index "i" corresponds to the activity level AL. The level corresponding correction value HQa(i) corresponding to the activity level AL of the current MB is used as the QP correction value Qoff for the current MB. If the activity level AL of the current MB is "0", for example, the level corresponding correction value HQa(0) is used as the QP correction value Qoff. The quantization parameter correction part 13 corrects the quantization parameter Qr by adding the determined QP correction value Qoff to the quantization parameter Qr.

The quantization parameter correction part 13 may correct a quantization step value, not the quantization parameter Qr. In other words, the quantization parameter correction part 13 has only to correct a set value to be used for determining the coarseness of quantization for the current MB.

The quantization parameter correction part 13 comprises a code amount accumulation part 131, an excessive code amount calculation part 132, and a correction value updating part 133.

The code amount accumulation part 131 calculates the cumulative amount of generated codes Ct by accumulating the respective amounts of generated codes RM of the macroblocks ranging from a first macroblock which is first encoded to the current MB. The code amount accumulation part 131 calculates the cumulative target amount of codes Tt by accumulating the target amounts of codes set for the macroblocks from the first macroblock to the current MB, respectively.

The excessive code amount calculation part 132 calculates the excessive amount of codes Et by subtracting the cumulative target amount of codes Tt from the cumulative amount of generated codes Ct every time when a macroblock is encoded.

The correction value updating part 133 updates the level corresponding correction value HQa(i) used as the QP correction value Qoff for the current MB.

The encoding part 14 encodes the current MB by using the corrected quantization parameter Qr. The encoding part 14 comprises a quantization part 141 and an arithmetic coding part 142. The quantization part 141 quantizes the current MB by using the corrected quantization parameter Qr. The arithmetic coding part 142 performs arithmetic coding of the quantized current MB.

The image coding apparatus 1 can prevent the amount of generated codes of a whole picture from significantly exceeding the target amount of codes of the whole picture since the image coding apparatus 1 performs the code amount control every time when a macroblock is encoded. In the image coding apparatus 1, the quantization of the macroblock is performed only once in order to generate the H.264 image data 22. The image coding apparatus 1 does not perform the quantization of the macroblock, other than the above quantization, for the purpose of using the macroblock for the code amount control. The image coding apparatus 1 can encode the uncompressed image data 21 in real time since the amount of computation for the code amount control is reduced.

Hereafter, an operation of the image coding apparatus 1 will be discussed.

{2. Determination of Activity Level}

First, an operation of the activity level determination part 12 will be discussed. As discussed above, the QP correction value Qoff for the current MB is determined on the basis of the activity level AL of the current MB. For this reason, first, the activity level AL will be described in detail. Hereinafter, the activity level AL is referred to simply as "level AL".

Figure 2:
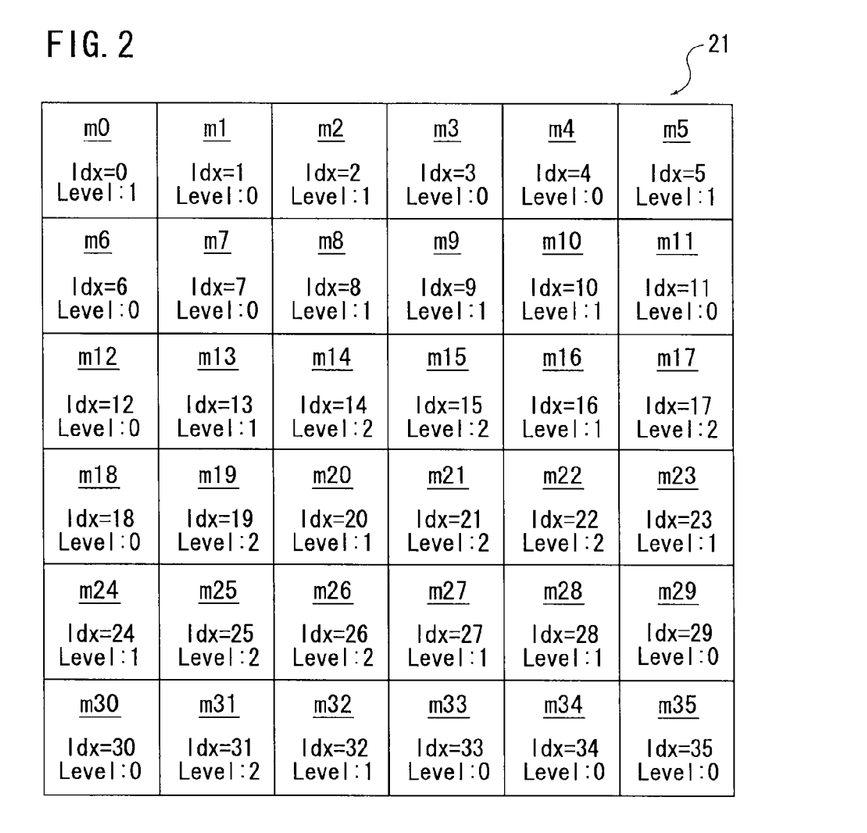
FIG. 2 is a view showing a structure of a macroblock of uncompressed image data.

FIG. 2 is a view showing a structure of a macroblock of the uncompressed image data 21. As shown in FIG. 2, a picture of the uncompressed image data 21 consists of 36 macroblocks m0 to m35 as an example. One picture has a matrix arrangement with 6 row macroblocks and 6 column macroblocks.

The activity is a numerical value indicating the degree of dispersion of pixel values in a macroblock and calculated for each macroblock. The activity level determination part 12 calculates the activity of the current MB by using Eq. (1).

$$\text{Activity} = \sum_{j=0}^{v-1} \sum_{i=0}^{h-2} |Y_{(i+1,j)} - Y_{(i,j)}| \quad (1)$$

In Eq. 1, "v" represents the number of pixels in the macroblock in a vertical line direction and "h" represents the number of pixels in the macroblock in a horizontal line direction. "Y" represents a pixel value of each pixel in the macroblock. As expressed by Eq. (1), the activity is a sum of absolute differences (SAD) between the pixel value of a pixel (specified pixel) and the pixel value of an adjacent pixel which is adjacent to the specified pixel on the right side. As the pixel value, a luminance value, a color component value, or the like may be used. The adjacent pixel may be a pixel adjacent to the specified pixel on the left side or adjacent to the specified pixel on the upper or lower side. Instead of the pixel value of the adjacent pixel, an average value of the pixel values of a plurality of pixels surrounding the specified pixel may be used. The activity level determination part 12 may calculate the dispersion of the pixel values in the macroblock as the activity.

Figure 3:
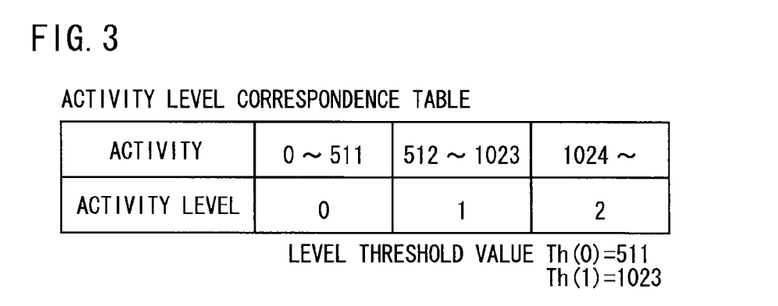
FIG. 3 shows a table representing a correspondence between an activity and an activity level.

The activity level determination part 12 determines the level AL of the current MB on the basis of the calculated activity of the current MB. FIG. 3 shows a correspondence between the activity and the level AL. As shown in FIG. 3, if the activity of the current MB is in the range from 0 to 511, the level AL is set to "0". If the activity of the current MB is in the range from 512 to 1023, the level AL is set to "1". If the activity of the current MB is 1024 or larger, the level AL is set to "2". Therefore, as shown in FIG. 2, the macroblocks m0 to m35 are classified into three groups of activity levels "0", "1", and "2".

An operation flow for determining the level AL of the current MB will be discussed. As shown in FIG. 3, level threshold values Th(0) and Th(1) to be used for determination of the level AL are set in the activity level determination part 12. The level threshold values Th(0) and Th(1) correspond to the upper limit values of the activities of the level AL "0" and "1". Specifically, the respective set values of the level threshold values Th(0) and Th(1) are "511" and "1023".

Figure 4:
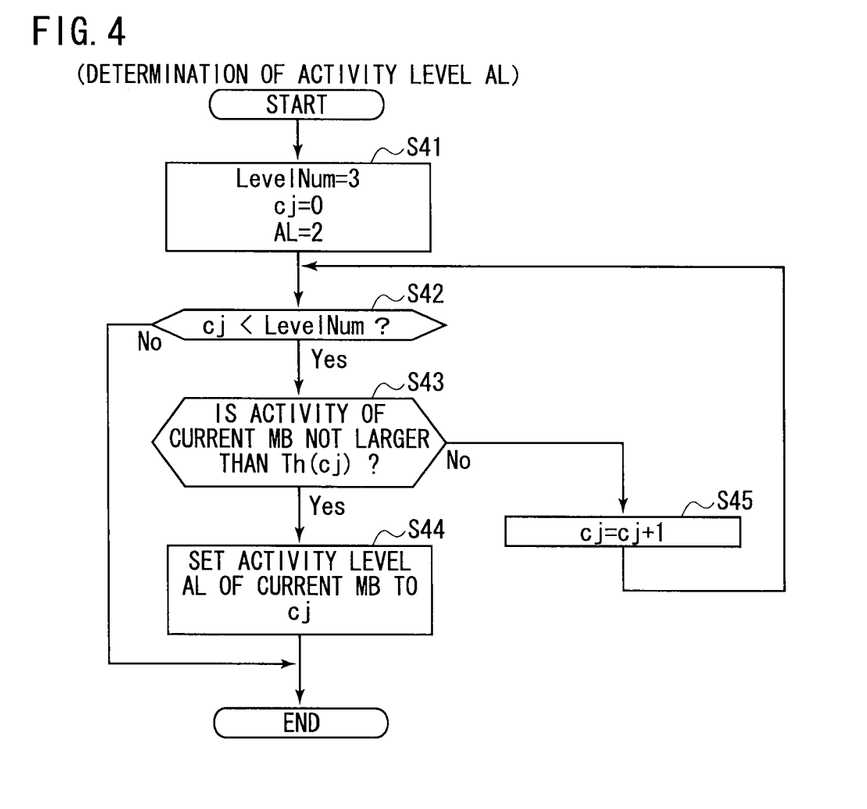
FIG. 4 is a flowchart showing an operation flow for determining the activity level.

FIG. 4 is a flowchart showing an operation flow for determining the level AL of current MB. The activity level determination part 12 performs initialization (Step S41). Specifically, "LevelNum" representing the maximum value of the level AL is set to "2". A loop counter, "cj", is set at "0". The initial value of the level AL is set to "2".

If "cj" is smaller than "LevelNum" ("Yes" in Step S42), the activity level determination part 12 compares the activity of the current MB with the level threshold value Th(cj) (Step S43).

If the activity of the current MB is not larger than the level threshold value Th(cj) ("Yes" in Step S43), the activity level determination part 12 sets the level AL of the current MB to "cj" from "2" (Step S44). On the other hand, if the activity of the current MB is larger than the level threshold value Th(cj) ("No" in Step S43), the activity level determination part 12 increments "cj" (Step S45) and the process goes back to Step S42.

If "cj" is not smaller than "LevelNum" ("No" in Step S42), this means that the activity of the current MB is larger than the level threshold value Th(1). Therefore, the activity level determination part 12 finishes the operation shown in FIG. 4 while keeping the level AL of the current MB set to the initial value of "2".

{3. Operation Flow of Code Amount Control}

Figure 5:
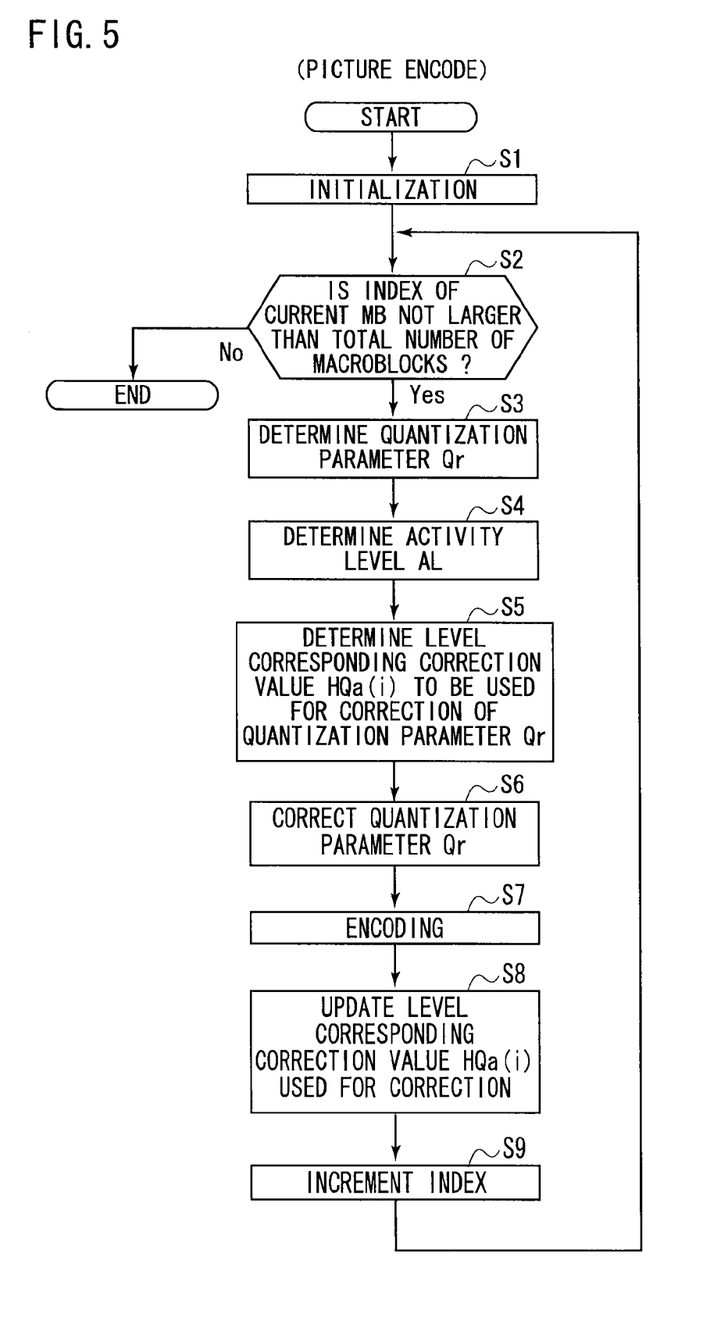
FIG. 5 is a flowchart showing an operation flow of encoding on a picture-by-picture basis.

The code amount control performed during the encoding of the uncompressed image data 21 will be discussed in detail. FIG. 5 is a flowchart showing an operation flow for encoding each picture of the uncompressed image data 21. The image coding apparatus 1 performs the code amount control every time when a macroblock is encoded.

First, the image coding apparatus 1 initializes various types of parameters to be used for the code amount control (Step S1). The parameters will be discussed in detail in the steps of the code amount control. The image coding apparatus 1 checks if an index of the current MB is not larger than the total number of macroblocks in the picture (Step S2).

If the index is larger than the total number of macroblocks ("No" in Step S2), the image coding apparatus 1 determines that the encoding of all the macroblocks in the picture is completed and finishes the operation shown in FIG. 5.

If the index is not larger than the total number of macroblocks ("Yes" in Step S2), the quantization parameter determination part 11 determines the quantization parameter Qr of the current MB (Step S3). The quantization parameter Qr is determined on the basis of the coding cost, the motion compensation cost, and the like of the current MB. The activity level determination part 12 calculates the activity of the current MB and determines the level AL of the current MB as discussed above (Step S4).

The quantization parameter correction part 13 determines the QP correction value Qoff to be used for the correction of the quantization parameter Qr on the basis of the level AL of the current MB (Step S5). For example, the level AL of the macroblock m4 is "0" (see FIG. 2). Therefore, the level corresponding correction value HQa(0) is set as the QP correction value Qoff of the macroblock m4. The quantization parameter correction part 13 corrects the quantization parameter Qr of the current MB by adding the QP correction value Qoff to the quantization parameter Qr (Step S6).

FIG. 6 shows a table representing initial values of variable parameters which vary in accordance with the encoding of a macroblock among the parameters to be used for the code amount control. The initial value of the level corresponding correction value HQa(i) is "0" regardless of the level AL. Therefore, the quantization parameter Qr of the macroblock m0 which is the first macroblock is not substantially changed. Detailed discussion on the parameters shown in FIG. 6 other than the level corresponding correction value HQa(i) will be made later.

The level corresponding correction value HQa(i) increases in accordance with a result of comparison between the cumulative amount of generated codes Ct obtained by accumulating the respective amounts of generated codes of the encoded macroblocks discussed later and the cumulative target amount of codes Tt obtained by accumulating the target amounts of codes set for the encoded macroblocks, respectively. For example, since the level AL of the macroblock m8 is "1" (see FIG. 2), the level corresponding correction value HQa(1) is used as the QP correction value Qoff of the macroblock m8. If the level corresponding correction value HQa(1) is not smaller than "0", the quantization parameter Qr of the macroblock m8 increases in accordance with the correction.

The encoding part 14 encodes the current MB by using the corrected quantization parameter Qr (Step S7). The quantization part 141 quantizes the current MB by using the corrected quantization parameter Qr. The arithmetic coding part 142 arithmetically encodes the quantized current MB. The arithmetic coding is performed by using the CABAC (Context-Adaptive Binary Arithmetic Coding) system or the like. When the value of the quantization parameter Qr is increased by the correction of the quantization parameter Qr (Step S6), the amount of generated codes of the current MB is reduced since the current MB is quantized coarsely.

The correction value updating part 133 updates the level corresponding correction value HQa(i) used as the QP correction value Qoff of the current MB (Step S8). For example, when the macroblock m8 is encoded, the level corresponding correction value HQa(1) used as the QP correction value Qoff of the macroblock m8 is to be updated. The update condition will be discussed later in detail.

{4. Operation of Step S8}

The update of the level corresponding correction value HQa(i) (Step S8, see FIG. 5) will be discussed in detail. Hereinafter, discussion will be made on an exemplary case where the macroblock m8 is encoded as the current MB. Since the level AL of the macroblock m8 is "1" (see FIG. 2), the level corresponding correction value HQa(1) is to be updated.

Figure 7:
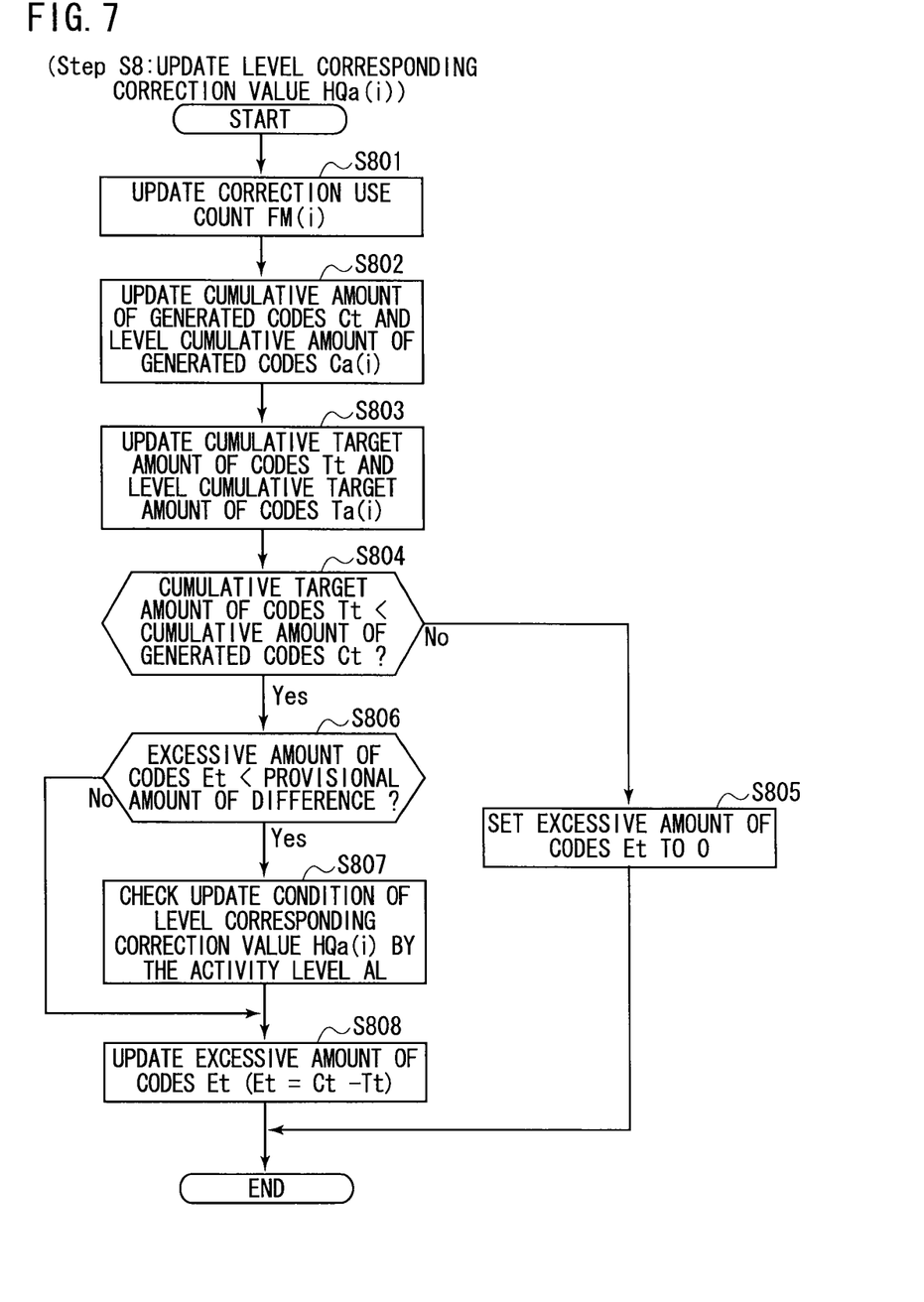
FIG. 7 is a flowchart showing an operation flow of Step S8 shown in FIG. 5.

FIG. 7 is a flowchart showing an operation flow of Step S8. The level corresponding correction value HQa(1) used as the QP correction value Qoff of the macroblock m8 is updated when all the update conditions discussed below are satisfied.

First, since the level corresponding correction value HQa(1) is used as the QP correction value Qoff during the encoding of the macroblock m8, the quantization parameter correction part 13 increments the correction use count FM(1) by 1 (Step S801). The correction use count FM(1) indicates the number of uses of the level corresponding correction value HQa(1). The correction use count FM(1) is one of the parameters to be used for the check of the update condition of the level corresponding correction value HQa(1). The correction use count FM(i) will be discussed later in detail in Step S814 (see FIG. 9).

The code amount accumulation part 131 updates the parameters relating to the amount of codes to the latest ones (Steps S802 and S803). In Step S802, the code amount accumulation part 131 adds the amount of generated codes RM of the macroblock m8 to the cumulative amount of generated codes Ct and the level cumulative amount of generated codes Ca(1). The cumulative amount of generated codes Ct is obtained by accumulating the respective amounts of generated codes RM of the encoded macroblocks m0 to m8. The cumulative amount of generated codes Ct corresponds to the amount of generated codes of the whole picture at the point of time when the encoding of the macroblock m8 is ended. The level cumulative amount of generated codes Ca(1) is obtained by accumulating the respective amounts of generated codes RM of the macroblocks m0, m2, m5, and m8 which are classified into the level AL of "1" (see FIG. 2) among the encoded macroblocks m0 to m8. As shown in FIG. 6, the initial value of the level cumulative amount of generated codes Ca(i) is "0" regardless of the level AL. The level cumulative amount of generated codes Ca(i) is used in the operation shown in FIG. 9.

Figure 8:
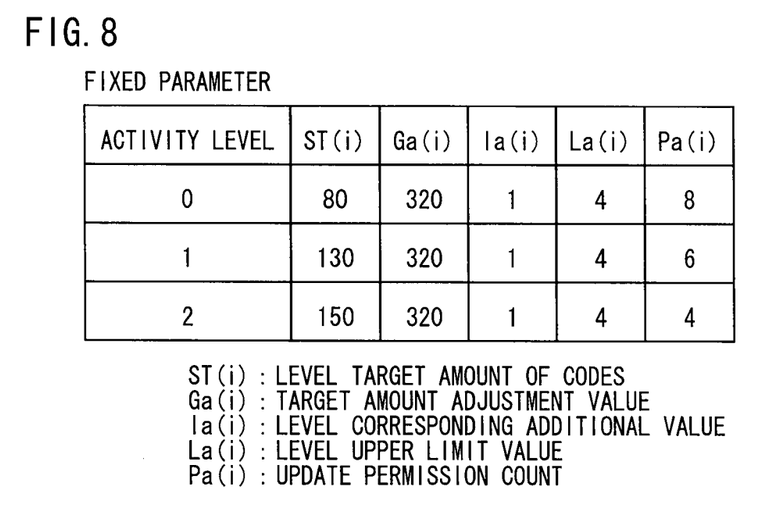
FIG. 8 shows a table representing set values of fixed parameters which are set in accordance with the activity level.

In Step S803, the code amount accumulation part 131 adds the target amount of codes set for the macroblock m8 to the cumulative target amount of codes Tt and the level cumulative target amount of codes Ta(1). Herein, setting of the target amount of codes for the current MB will be discussed. FIG. 8 shows initial values of fixed parameters set in advance in accordance with the levels AL among various types of parameters to be used for the code amount control. The target amount of codes of the macroblock m8 is set on the basis of the level AL and the level target amount of codes ST(i) shown in FIG. 8. The level target amount of codes ST(i) is the target amount of codes set for each level AL. Since the level AL of the macroblock m8 is "1", the target amount of codes of the macroblock m8 is set to ST(1)=130. The parameters shown in FIG. 8 other than the level target amount of codes ST(i) will be discussed later.

The cumulative target amount of codes Tt is a value obtained by accumulating the target amounts of codes set for the encoded macroblocks m0 to m8, respectively. The cumulative target amount of codes Tt corresponds to the target amount of codes of the whole picture at the point of time when the encoding of the macroblock m8 is ended. The level cumulative target amount of codes Ta(1) is obtained by accumulating the respective target amounts of codes of the macroblocks m0, m2, m5, and m8 which are classified into the level AL of "1" (see FIG. 2) among the encoded macroblocks m0 to m8. As shown in FIG. 6, the initial value of the level cumulative target amount of codes Ta(i) is "0" regardless of the level AL. The level cumulative target amount of codes Ta(1) is used in the operation shown in FIG. 9.

After the execution of Step S803, the quantization parameter correction part 13 compares the cumulative target amount of codes Tt with the cumulative amount of generated codes Ct (Step S804). If the cumulative target amount of codes Tt is smaller than the cumulative amount of generated codes Ct ("Yes" in Step S804), the quantization parameter correction part 13 determines that one of the update conditions of the level corresponding correction value HQa(1) is satisfied. This is because there is a good possibility that the amount of generated codes of the whole picture exceeds the target amount of codes of the whole picture at the end of the picture encode.

There is another possibility, however, that the cumulative target amount of codes Tt remains smaller than the cumulative amount of generated codes Ct every time when the macroblock of which the level AL is "1" is encoded. In such a state, if the level corresponding correction value HQa(1) is increased every time when the macroblock with the level AL of "1" is encoded, the image quality of the macroblock with level AL of "1" is sharply degraded. In order to prevent the sharp degradation in the image quality of the macroblock with the level AL of "1", the correction value updating part 133 checks if all the other update conditions of the level corresponding correction value HQs(1) are satisfied by executing Steps S806 and S807.

In the operation of Step S806, the excessive amount of codes Et and the provisional amount of difference are used. The excessive amount of codes Et is obtained by subtracting the cumulative target amount of codes Tt from the cumulative amount of generated codes Ct before the encoding of the macroblock m8 (at the point of time when the encoding of the macroblock m7 is ended). The provisional amount of difference is obtained by subtracting the cumulative target amount of codes Tt from the cumulative amount of generated codes Ct at the point of time when the encoding of the macroblock m8 is ended. In other words, the provisional amount of difference corresponds to the excessive amount of codes Et at the point of time when the encoding of the macroblock m8 is ended.

If the provisional amount of difference is larger than the excessive amount of codes Et ("Yes" in Step S806), the correction value updating part 133 determines that the update condition of the level corresponding correction value HQa(1) used as the QP correction value Qoff of the macroblock m8 is satisfied. This is because the difference between the amount of generated codes of the whole picture (the cumulative amount of generated codes Ct) and the target amount of codes of the whole picture (cumulative target amount of codes Tt) increases as the macroblock m8 is encoded. The correction value updating part 133 checks the update condition of the level corresponding correction value HQa(1) by the level AL (Step S807). The operation of Step S807 will be discussed later in detail.

The excessive code amount calculation part 132 updates the excessive amount of codes Et to the latest state (Step S808). Specifically, the excessive amount of codes Et is set to a value (provisional amount of difference) obtained by subtracting the cumulative target amount of codes Tt from the cumulative amount of generated codes Ct at the point of time when the macroblock m8 is encoded.

In Step S806, if the provisional amount of difference is not larger than the excessive amount of codes Et ("No" in Step S806), the correction value updating part 133 does not update the level corresponding correction value HQa(1). In this case, the difference between the amount of generated codes of the whole picture (the cumulative amount of generated codes Ct) and the target amount of codes of the whole picture (the cumulative target amount of codes Tt) tends to decrease. The correction value updating part 133 determines that the amount of generated codes of the whole picture will become not larger than the target amount of codes of the whole picture even if the level corresponding correction value HQa(1) is not updated. Since the frequency of update of the level corresponding correction value HQa(1) is thereby suppressed, it is possible to prevent the image quality of the macroblock with the level AL of "1" from being sharply degraded. The excessive code amount calculation part 132 updates the excessive amount of codes Et to the latest state (Step S808).

In Step S804, if the cumulative amount of generated codes Ct is not larger than the cumulative target amount of codes Tt ("Yes" in Step s804), the level corresponding correction value HQa(1) is not updated. The excessive code amount calculation part 132 sets the excessive amount of codes Et to "0" (Step S805) and the operation shown in FIG. 7 is ended.

{5. Detailed Operation of Step S807}

Figure 9:
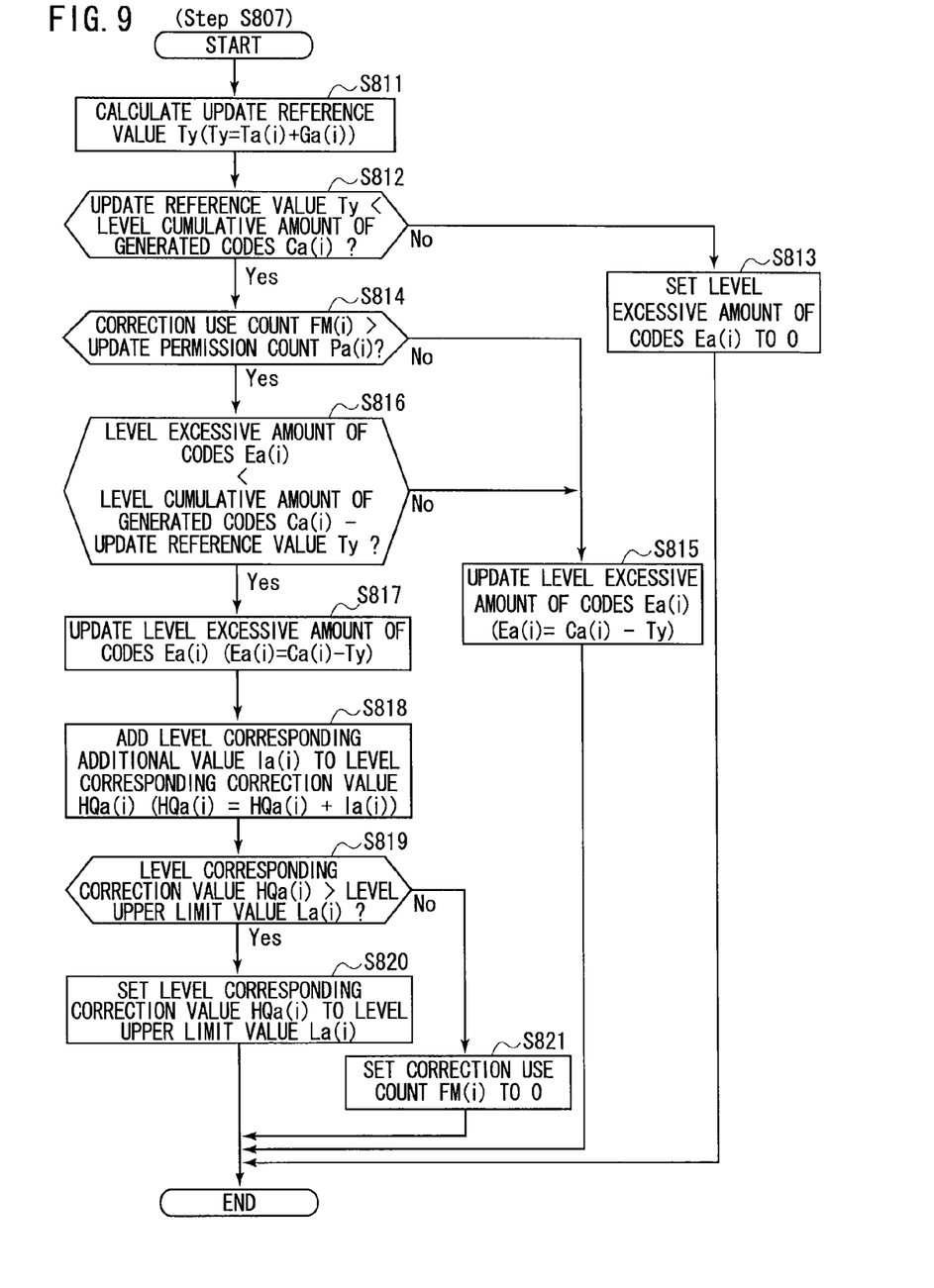
FIG. 9 is a flowchart showing an operation flow of Step S807 shown in FIG. 7.

FIG. 9 is a flowchart showing a detailed operation flow of Step S807. Hereinafter, like the discussion of the operation shown in FIG. 7, an operation performed after the encoding of the macroblock m8 with the level AL of "1" is ended will be discussed as an exemplary case. The quantization parameter correction part 13 checks if the update condition of the level corresponding correction value HQa(1) used as the QP correction value Qoff of the macroblock m8 is satisfied by using the parameters set for each level AL.

In the operation of FIG. 9, used are the level cumulative amount of generated codes Ca(1), the level cumulative target amount of codes Ta(1), and the like which are described in Steps S802 and S803 (see FIG. 7). The level cumulative amount of generated codes Ca(1) is obtained by accumulating the respective amounts of generated codes RM of the encoded macroblocks m0, m2, m5, and m8 of which the level AL is "1" (see FIG. 2). The level cumulative target amount of codes Ta(1) is obtained by accumulating the target amounts of codes set for the macroblocks m0, m2, m5, and m8, respectively.

As discussed above, it is necessary to prevent the sharp degradation of the image quality of the macroblock with the level AL of "1" due to frequent update of the level corresponding correction value HQa(1). Then, the correction value updating part 133 adds the target amount adjustment value Ga(1) to the level cumulative target amount of codes Ta(1) to thereby calculate an update reference value Ty to be used for the comparison with the level cumulative amount of generated codes Ca(1) (Step S811). As shown in FIG. 8, the target amount adjustment value Ga(i) is set to the same value regardless of the level AL. The target amount adjustment value Ga(i), however, may be set to a different value in accordance with the levels AL.

In order to check if the update condition of the level corresponding correction value HQa(1) is satisfied, the correction value updating part 133 compares the level cumulative amount of generated codes Ca(1) with the update reference value Ty (Step S812). The correction value updating part 133 does not directly compare the level cumulative amount of generated codes Ca(1) with the level cumulative target amount of codes Ta(1). This prevents the level corresponding correction value HQa(1) from being updated every time when the level cumulative amount of generated codes Ca(1) exceeds the level cumulative target amount of codes Ta(1).

If the level cumulative amount of generated codes Ca(1) is larger than the update reference value Ty ("Yes" in Step S812), the correction value updating part 133 determines that the update condition of the level corresponding correction value HQa(1) is satisfied and the process goes to Step S814. This is because it is thought that the encoding of the macroblock with the level AL of "1" causes the cumulative amount of generated codes Ct to exceed the cumulative target amount of codes Tt ("Yes" in Step S804: see FIG. 7).

The correction value updating part 133 compares the correction use count FM(1) with an update permission count Pa(1) (Step S814). As discussed above, the correction use count FM(1) represents the number of uses of the updated level corresponding correction value HQa(1) as the QP correction value Qoff. The update permission count Pa(1) represents the number of uses of the level corresponding correction value HQa(1) until the update of the level corresponding correction value HQa(1) is permitted. As shown in FIG. 8, the update permission count Pa(1) is set at "6". In order to update the level corresponding correction value HQa(1), it is needed that the level corresponding correction value HQa(1) should be used as the QP correction value Qoff seven times or more.

If the correction use count FM(1) is larger than the update permission count Pa(1) ("Yes" in Step S814), the correction value updating part 133 determines that the update condition of the level corresponding correction value HQa(1) is satisfied and the process goes to Step S816.

In the operation of Step S816, used are the level excessive amount of codes Ea(1) and a level provisional amount of difference. The level excessive amount of codes Ea(1) is obtained by subtracting the update reference value Ty from the level cumulative amount of generated codes Ca(1). The level excessive amount of codes Ea(1) is updated every time when the macroblock with the level AL of "1" is encoded. At the start of the operation shown in FIG. 9, the level excessive amount of codes Ea(1) has a value calculated when the macroblock m5 with the level AL of "1" is encoded. The level provisional amount of difference is obtained by subtracting the update reference value calculated in Step S811 from the level cumulative amount of generated codes Ca(1) calculated in Step S802. In other words, the level provisional amount of difference corresponds to the level excessive amount of codes Ea(1) which is updated in accordance with the encoding of the macroblock m8.

If the level provisional amount of difference is larger than the level excessive amount of codes Ea(1) ("Yes" in Step S816), the level excessive amount of codes Ea(1) tends to increase. In this case, the correction value updating part 133 determines that all the update conditions of the level corresponding correction value HQa(1) are satisfied. As the updating of the level corresponding correction value HQa (1), the operation of Steps S817 to S821 is performed.

The excessive code amount calculation part 132 sets a value (level provisional amount of difference) obtained by subtracting the update reference value calculated in Step S811 from the level cumulative amount of generated codes Ca(1) calculated in Step S802 as the level excessive amount of codes Ea(1) (Step S817). The level excessive amount of codes Ea(1) is thereby updated to a value in accordance with the encoding of the macroblock m8.

In order to update the level corresponding correction value HQa(1), the correction value updating part 133 adds a level corresponding additional value Ia(1) to the level corresponding correction value HQa(1) (Step S818). The level corresponding additional value Ia(1) is a numerical value to be added for the updating of the level corresponding correction value HQa(1). As shown in FIG. 8, the level corresponding additional value Ia(1) is set at "1" regardless of the level AL. The level corresponding additional value Ia(1), however, may be set to a different value in accordance with the levels AL.

In order to prevent the level corresponding correction value HQa(1) from increasing without limit, the correction value updating part 133 compares the updated level corresponding correction value HQa(1) with a level upper limit value La(1) (Step S819). If the updated level corresponding correction value HQa(1) is larger than the level upper limit value La(1) ("Yes" in Step S819), the correction value updating part 133 sets the updated level corresponding correction value HQa(1) to the level upper limit value La(1) again (Step S820). As shown in FIG. 8, the level upper limit value La(1) is "4". Since the level corresponding correction value HQa(1) does not become larger than the level upper limit value La(1), it is possible to prevent extreme degradation of the image quality of the macroblock with the level AL of "1".

On the other hand, if the updated level corresponding correction value HQa(1) is not larger than the level upper limit value La(1) ("No" in Step S819), the updated level corresponding correction value HQa(1) is used without any change. Since the level corresponding correction value HQa (1) is updated, the correction value updating part 133 sets the correction use count FM(1) at "0" (Step S821). Unless the number of uses of the updated level corresponding correction value HQa(1) exceeds the update permission count Pa(1), the level corresponding correction value HQa(1) is not updated again.

Back to the discussion of Step S816, if the level provisional amount of difference is not larger than the level excessive amount of codes Ea(1) ("No" in Step S816), the level excessive amount of codes Ea(1) tends to decrease. Therefore, the correction value updating part 133 determines that the update condition of the level corresponding correction value HQa(1) is not satisfied. The excessive code amount calculation part 132 updates the level excessive amount of codes Ea(1) in accordance with the encoding of the macroblock m8 (Step S815). In Step S815, performed is the same operation discussed in Step S817.

Back to the discussion of Step S814, if the correction use count FM(1) is not larger than the update permission count Pa(1) ("No" in Step S814"), the correction value updating part 133 determines that the update condition of the level corresponding correction value HQa(1) is not satisfied. In this case, the level corresponding correction value HQa(1) is not updated. The excessive code amount calculation part 132 updates the level excessive amount of codes Ea(1) in accordance with the encoding of the macroblock m8 (Step S815).

As discussed above, the image coding apparatus 1 of the present preferred embodiment performs the code amount control every time when the macroblock is encoded. For the code amount control, used is the result of comparison between the amount of generated codes of the whole picture and the target amount of codes of the whole picture. For the code amount control, further, used are the result of comparison between an accumulated value of the amounts of generated codes and an accumulated value of the target amounts of codes of the macroblocks which are classified into the same level AL as that of the current MB, and the like. As a result, since the amount of computation required for the code amount control is reduced, the image coding apparatus 1 can encode the uncompressed image data 21 in real time and prevent the amount of generated codes of each picture from significantly exceeding the target amount of codes of each picture.

The image coding apparatus 1 determines the level corresponding correction value HQa(i) to be used for the correction of the quantization parameter Qr on the basis of the level AL of the current MB. The level corresponding correction value HQa(i) used for the correction is updated on the basis of the above-discussed comparison result. Thus, since the image coding apparatus 1 performs the code amount control in accordance with the activity of the macroblock, the image coding apparatus 1 can prevent the respective image qualities of all the macroblocks from being uniformly degraded due to the code amount control.

In the present preferred embodiment, the exemplary case where the QP correction value Qoff is set in accordance with the level AL of the current MB has been discussed. The level corresponding correction value HQa(i) corresponding to the level AL, however, is not necessarily used. For example, the QP correction value Qoff may be increased when the cumulative amount of generated codes Ct becomes larger than the cumulative target amount of codes Tt. In this case, it is possible to reduce the number of parameters required for the code amount control and also reduce the amount of computation for the code amount control.

In Step S812 of FIG. 9, the correction value updating part 133 compares the level cumulative amount of generated codes Ca(1) with the update reference value Ty. In Step S812, however, the correction value updating part 133 may directly compare the level cumulative amount of generated codes Ca(1) with the level cumulative target amount of codes Ta(1). Since the update reference value Ty is not calculated, it is possible to reduce the amount of computation. In this case, for the updating of the level excessive amount of codes Ea(1) (Steps S815 and S816), the level cumulative amount of generated codes Ta(1) is used, instead of update reference values Ty.

{Variation}

Figure 10:
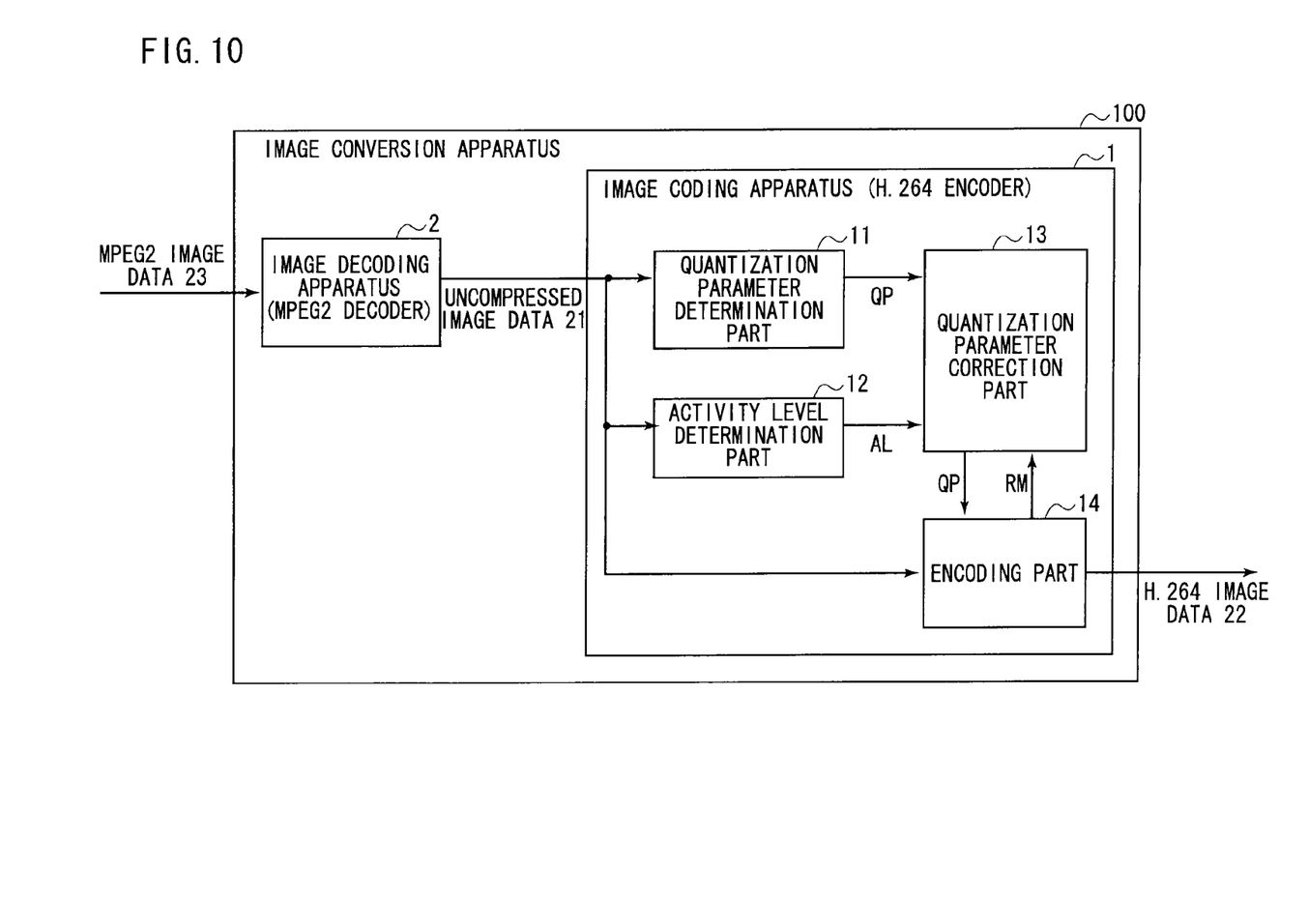
FIG. 10 is a block diagram showing a functional constitution of an image conversion apparatus in accordance with an exemplary variation of the preferred embodiment of the present invention.

The image coding apparatus 1 of the present preferred embodiment may be used as an encoding part of an image conversion apparatus. FIG. 10 is a block diagram showing a functional constitution of an image conversion apparatus 100 in accordance with an exemplary variation of the present preferred embodiment. The image conversion apparatus 100 comprises the image coding apparatus 1 and an image decoding apparatus 2. The image coding apparatus 1 is the apparatus described in the above-discussed preferred embodiment.

The image decoding apparatus 2 is an MPEG2 decoder. The image decoding apparatus 2 decodes MPEG2 image data 23 encoded according to the MPEG2 system to generate uncompressed image data 21. The uncompressed image data 21 is inputted to the image coding apparatus 1. The image coding apparatus 1 recodes the uncompressed image data 21 according to the H.264 system in the same procedure as discussed in the present preferred embodiment. It is thereby possible to convert the MPEG2 image data 23 into the H.264 image data 22 in real time and prevent the amount of generated codes of the H.264 image data per picture from significantly exceeding the target amount of codes.

FIG. 10 shows the image conversion apparatus 100 which converts the MPEG2 image data 23 into the H.264 image data 22. The image decoding apparatus 2, however, may decode the H.264 image data inputted to the image conversion apparatus 100. In this case, the uncompressed image data 21 is encoded under a condition different from the encoding condition of the inputted H.264 image data.

While the invention has been shown and described in detail, the foregoing description is in all aspects illustrative and not restrictive. It is therefore understood that numerous modifications and variations can be devised without departing from the scope of the invention.

What is claimed is:

1. A method for encoding uncompressed image data including a plurality of pictures, the method comprising:
   determining, by circuitry, a coarseness set value indicating the coarseness of quantization of a current macroblock to be encoded when each picture is to be encoded on a macroblock basis;
   correcting, by the circuitry, said coarseness set value by adding a correction value to said coarseness set value; and
   encoding said current macroblock by using said corrected coarseness set value, wherein
   said correcting by the circuitry includes
      calculating, when said current macroblock has been encoded, a first cumulative amount of generated codes by accumulating the respective amounts of generated codes of macroblocks in a picture being encoded ranging from a first macroblock which is first encoded up to and including said current macroblock;
      calculating, when said current macroblock has been encoded, a first cumulative target amount of codes by accumulating the target amounts of codes set for said macroblocks in said picture ranging from the first macroblock up to and including said current macroblock, respectively;
      calculating a first excessive amount of codes by subtracting the first cumulative target amount of codes from said first cumulative amount of generated codes;
      calculating a second excessive amount of codes by subtracting a sum total of the target amounts of codes set for one or more macroblocks, respectively, ranging from said first macroblock up to and including a macroblock that has been encoded directly before said current macroblock, from a sum total of the respective amounts of generated codes of the one or more macroblocks;
      when the first excessive amount of codes is greater than zero:
         comparing the first excessive amount of codes with the second excessive amount of codes,
         increasing said correction value when the first excessive amount of codes is larger than the second excessive amount of codes, and
         maintaining said correction value when the first excessive amount of codes is smaller than the second excessive amount of codes;
      maintaining said correction value when the first excessive amount of codes is less than zero; and
      initializing the correction value, the first cumulative amount of generated codes and the first cumulative target amount of codes when the encoding of the picture is to begin.

2. The method according to claim 1, further comprising:
   determining, by the circuitry, a level of said current macroblock based on an activity indicating a degree of dispersion of pixel values in said current macroblock, wherein
   said correction value includes a level corresponding correction value corresponding to said level, and
   said correcting of said coarseness set value is performed using a current level corresponding correction value corresponding to a current level of said current macroblock among said level corresponding correction values.

3. The method according to claim 2, further comprising:
   calculating, by the circuitry, a second cumulative amount of generated codes by accumulating the respective amounts of generated codes of classified macroblocks which are classified into said current level among said macroblocks in said picture and calculating a second cumulative target amount of codes by accumulating the respective target amounts of codes of said classified macroblocks in said picture; and
   updating said current level corresponding correction value when said second cumulative amount of generated codes is larger than said second cumulative target amount of codes.

4. The method according to claim 3, further comprising:
   calculating, by the circuitry, a level excessive amount of codes by subtracting a sum total of the respective target amounts of codes of said classified macroblocks which has been encoded until said current macroblock is encoded from a sum total of the respective amounts of generated codes of said classified macroblocks; and
   updating, by the circuitry, said current level corresponding correction value when a difference between said second cumulative amount of generated codes and said second cumulative target amount of codes is larger than said level excessive amount of codes.

5. The method according to claim 3, further comprising:
   setting, by the circuitry, said current level corresponding correction value to an upper limit value when said updated current level corresponding correction value exceeds said upper limit value which is set in advance.

6. The method according to claim 3, further comprising:
   updating, by the circuitry, said current level corresponding correction value when said second cumulative amount of generated codes is larger than an update reference value which is a sum of said second cumulative target amount of codes and an adjustment value which is set correspondingly to said current level.

7. The method according to claim 3, further comprising:
   determining, by the circuitry when said current level corresponding correction value is updated, a correction use count which indicates a number of corrections of said coarseness set value according to said updated current level corresponding correction value; and updating, by the circuitry, said current level corresponding correction value when said correction use count is larger than a predetermined value.

8. An image conversion method, comprising:

generating uncompressed image data including a plurality of pictures by decoding coded image data;

determining, by circuitry, a coarseness set value indicating the coarseness of quantization of a current macroblock to be encoded when each picture of the plurality of pictures is to be encoded on a macroblock basis;

correcting, by the circuitry, said coarseness set value by adding a correction value to said coarseness set value; and encoding said current macroblock by using said corrected coarseness set value, wherein said correcting by the circuitry includes calculating, when said current macroblock has been encoded, a first cumulative amount of generated codes by accumulating the respective amounts of generated codes of macroblocks in a picture being encoded ranging from a first macroblock which is first encoded up to and including said current macroblock;

calculating, when said current macroblock has been encoded, a first cumulative target amount of codes by accumulating the target amounts of codes set for said macroblocks in said picture ranging from the first macroblock up to and including said current macroblock, respectively;

calculating a first excessive amount of codes by subtracting the first cumulative target amount of codes from said first cumulative amount of generated codes;

calculating a second excessive amount of codes by subtracting a sum total of the target amounts of codes set for one or more macroblocks, respectively, ranging from said first macroblock to a macroblock that has been encoded directly before said current macroblock, from a sum total of the respective amounts of generated codes of the one or more macroblocks;

when the first excessive amount of codes is greater than zero:

comparing the first excessive amount of codes with the second excessive amount of codes, increasing said correction value when the first excessive amount of codes is larger than the second excessive amount of codes, and maintaining said correction value when the first excessive amount of codes is smaller than the second excessive amount of codes;

maintaining said correction value when the first excessive amount of codes is less than zero; and initializing the correction value, the first cumulative amount of generated codes and the first cumulative target amount of codes when the encoding of the picture is to begin.

\* \* \* \* \*